April 1, 1958 V. YEADA 2,828,927
FISHING REEL
Filed Jan. 12, 1956 2 Sheets-Sheet 1

INVENTOR.
Victor Yeada
BY
ATTORNEY

April 1, 1958  V. YEADA  2,828,927
FISHING REEL
Filed Jan. 12, 1956  2 Sheets-Sheet 2
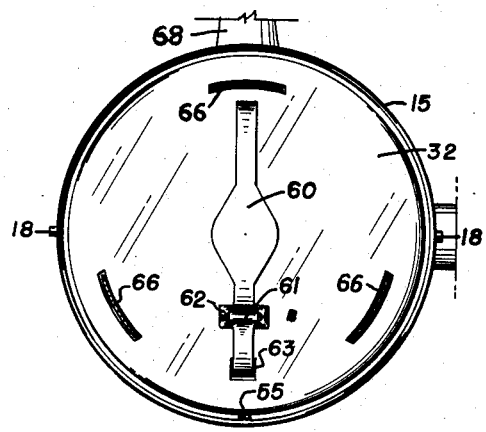
Fig. 5
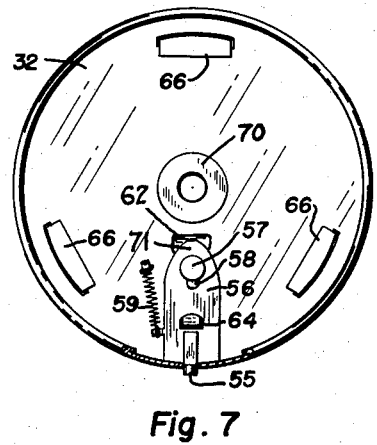
Fig. 7
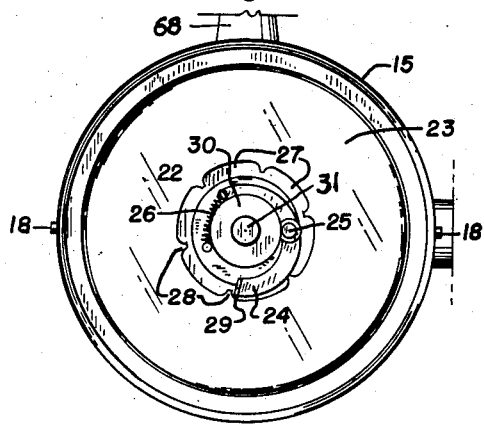
Fig. 6
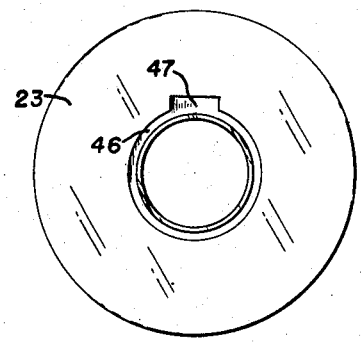
Fig. 8
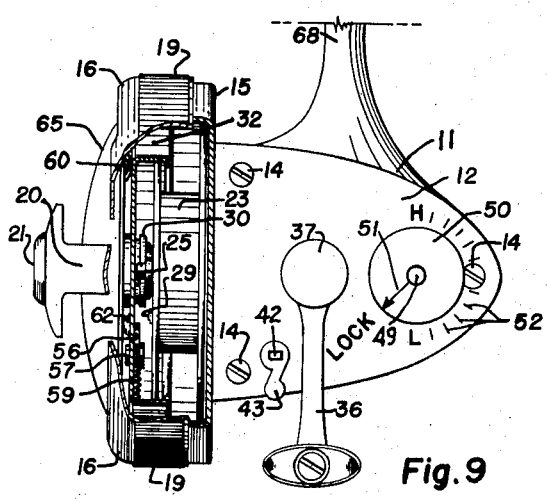
Fig. 9
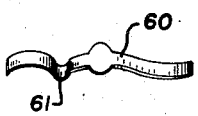
Fig. 10
INVENTOR.
BY Victor Yeada
ATTORNEY United States Patent Office 2,828,927
Patented Apr. 1, 1958

2,828,927
FISHING REEL

Victor Yeada, Denver, Colo., assignor to Wright & McGill Co., Denver, Colo.

Application January 12, 1956, Serial No. 558,795

9 Claims. (Cl. 242—84.2)

This invention relates to a fishing reel, more particularly to the type of reel known as a spinning reel, and has for its principal object the provision of means whereby the reel can be instantly converted from a crank-operated winding and retrieving reel to a free spinning reel with the touch of a finger.

Another object of the invention is to provide a spinning reel which will automatically convert itself into a winding reel when the winding crank is rotated.

A further object is to incorporate a brake mechanism in a spinning reel whereby the tension on a running fish line can be accurately controlled as it spins from the reel.

A still further object is to so construct the reel that spools of line can be quickly and easily interchanged in the reel.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 5 is a cross-section taken on the line 5—5, Fig. 4, with the front hood removed;

Fig. 6 is a front view of the improved reel as it would appear arranged for the removal of a line spool;

Fig. 7 is a detail view partially in section, looking toward the rear face of a line winder employed in the improved reel;

Fig. 8 is a rear face view of the line spool employed in the improved reel;

Fig. 9 is a side view of the improved reel partially in section, the section being taken on the line 9—9, Fig. 1; and Fig. 10 is a detail, perspective view illustrating a line winding release spring employed in the improved reel hereinafter known as the "touch plate spring."

Figures 1, 2:
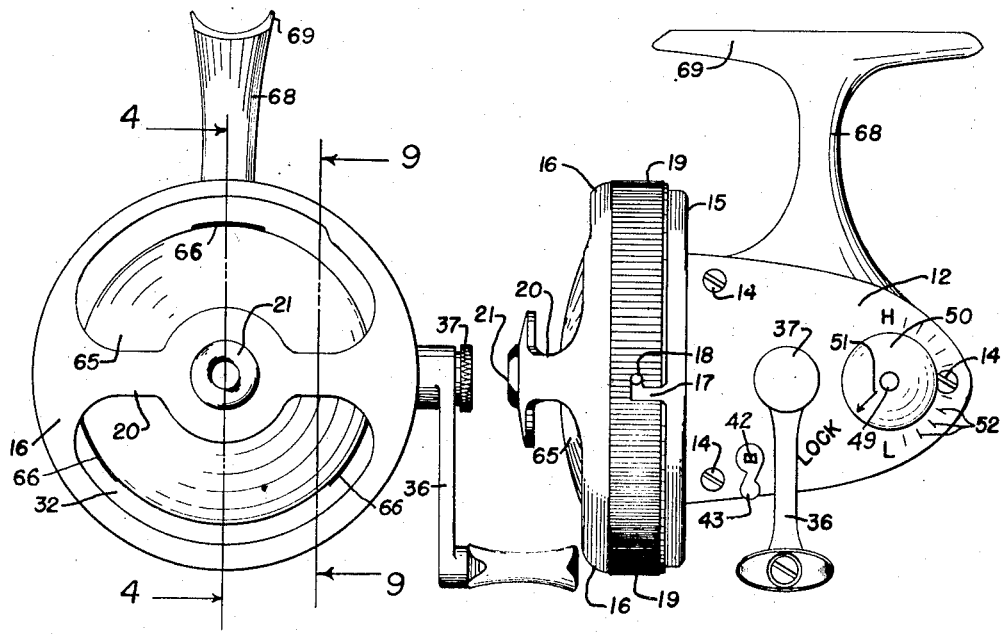
Fig. 1 is a front view of the improved reel, looking toward a front hood with which the reel is provided.
Fig. 2 is a left side view of the improved reel.

The improved reel consists of a housing 11, somewhat pear-shaped in longitudinal section, formed with two flat, open sides which are normally closed by similarly shaped side plates, herein designated as the left side plate 12 and the right side plate 13. The side plates 12 and 13 are secured to the housing 11 by means of suitable attachment screws 14. The housing 11 is provided with a bracket arm 68 terminating in a rod-engaging shoe 69 adapted to be secured to the reel seat of a conventional fishing rod by means of any of the usual attachment devices.

The housing 11 terminates at its forward extremity in a cup-shaped, circular casing 15 arranged to telescopically receive a front hood 16. The hood 16 is detachably attached to the casing 15 by means of bayonet slots 17 which engage locking pins 18 which protrude from the casing 15. The peripheral surface of the hood 16 is preferably knurled, as shown at 19, the major portion of the front face of the hood 16 is open, as illustrated, the opening being bridged by means of a bridge portion 20 which supports a line grommet 21 concentrically of the axis of the casing 15.

The casing 15 is provided with a cylindrical shaft sleeve 22 which is mounted in and extends forwardly from the rear wall of the casing 15 to provide an axial mounting for a line spool 23. The line spool is placed within the casing 15 by simply sliding it over the sleeve 22 and it is retained in place on the sleeve by means of an arcuate ratchet lever 24 which is pivotally mounted intermediate its extremities on a pivot pin 25 which is eccentrically fixed in the extremity of the sleeve 22 and extends forwardly therefrom.

A tension spring 26 connected to the first extremity of the lever 24 acts to urge the second extremity thereof radially outward into a ratchet recess 27 formed in the spool 23 about the axial opening therein. The extremity of the lever 24 is turned outwardly, as shown at 29, so that it may be engaged by the thumbnail of the fisherman and pressed inwardly to release the spool 23 and allow it to be withdrawn from the sleeve 22 for replacement.

The ratchet lever 24 acts against a plurality of spaced ratchet teeth 28, which extend inwardly from the peripheral wall of the recess 27, to prevent rotation of the spool in a counterclockwise direction in Fig. 6. The second extremity snaps over the teeth 28 to allow rotation in the other direction. The sleeve 22 is formed with a flanged line winder seat 30 which extends concentrically outwardly therefrom and partially protects the ratchet lever 24.

A line-winding shaft 31 extends axially through, and projects at both extremities from, the sleeve 22. The forward extremity of the shaft 31 projects from the seat 30 and is threaded to receive a hub 70 of a circular, cup-shaped line winder 32. The rim of the line winder extends rearwardly over and about the spool 23 so that it forms an annular line guide for directing the fishing line medially of the spool.

The rear extremity of the line-winding shaft 31 is provided with a toothed bevel pinion 33 which meshes with a bevel gear 34 mounted on a crank shaft 35 which extends through and is journalled in the left side plate 12. The crank shaft 35 may be rotated by means of a suitable crank 36 which is held in place on the extremity of the crank shaft by means of a knurled clamp nut 37.

Figures 3, 4:
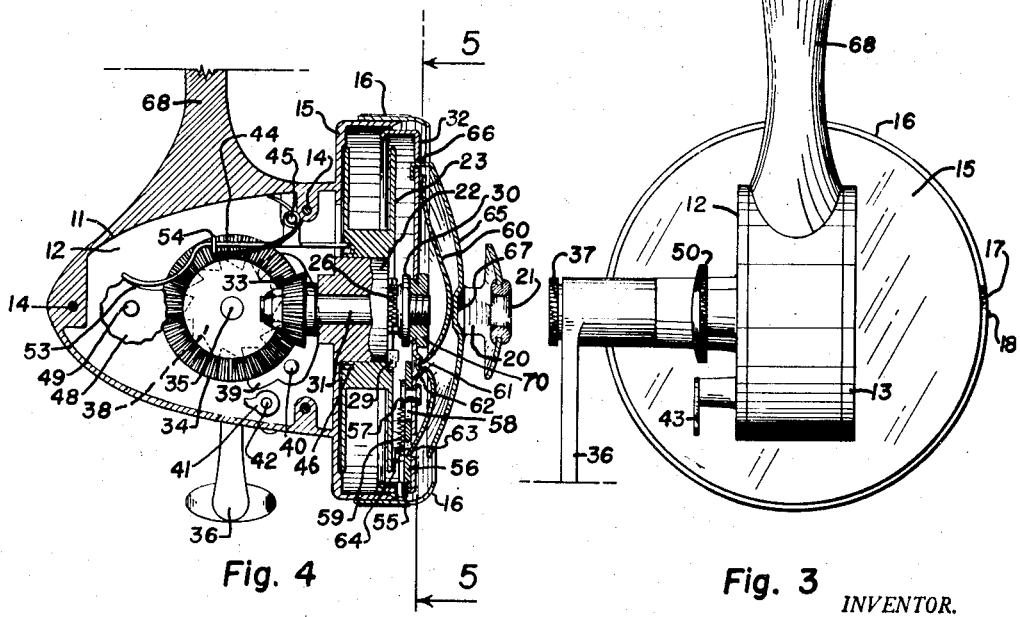
Fig. 3 is a rear view thereof.
Fig. 4 is a longitudinal section, taken on the line 4—4, Fig. 1.

A ratchet wheel 38 is mounted on the outer face of the gear 34 as shown in broken line in Fig. 4. A click lever 39 is mounted on a pivot pin 40 on the inside of the left side plate 12 so that it may engage the teeth of the ratchet wheel 38. One extremity of the click lever 39 is constantly urged toward engagement with the teeth of the ratchet wheel 38 by means of any suitable spring means. The latter extremity of the click lever 39 can be tilted out of engagement with the teeth of the ratchet wheel 38 by means of any suitable spring means. The latter extremity of the lever 39 can be tilted out of engagement with the teeth of the ratchet wheel 38 by bringing a release cam 41 into contact with the other extremity of the lever 39. The release cam 41 is mounted on a cam shaft 42 which extends through the left side plate 12 and terminates in a finger lever 43.

Thus, it can be seen that when the cam 41 is rotated out of contact with the lever 39, the latter will engage the teeth of the ratchet wheel 38 to prevent reverse rotation of the spool shaft 31 and allow a clicking forward rotation thereof, and when the cam has been brought into engagement with the lever 39, free rotation of the spool shaft is allowed in either direction.

Rotation of the line spool 23 on the sleeve 22 is resisted and controlled by means of an elongated resilient brake lever 44 which is tiltably suspended from a hinge pin 45 in the housing 11. The forward extremity of the brake lever 44 extends into a circular braking groove 46 formed in the rear face of the spool 23 which is shown more in detail in Fig. 8. A spool locking pocket 47 is formed in the outer wall of the brake groove 46 into which the forward extremity of the brake lever 44 may enter to lock the spool against rotation. The rear extremity of the brake lever 44 rides on a brake cam 48 mounted on a cam shaft 49 extending through the left side plate 12. The lever 44 is constantly urged into engagement with the cam 48 by means of a suitable tortion spring spring 54.

A knurled finger knob 50 is mounted on the outer extremity of the cam shaft 49, by means of which, the latter may be rotated. The knob 50 is provided with an index mark 51 which indicates positions on an index scale 52 on the side plate 12. When the index mark 51 is opposite a position on the scale which may be designated either "Gear" or "Lock," a low place 53 on the cam 48 is beneath the rear extremity of the brake lever 44 so as to allow the forward extremity thereof to rise into the locking pocket 47 to prevent rotation of the spool 23.

The cam 48 graduallly increases in diameter from the low place 53 so that as the knob 50 is rotated from the position "L" (meaning light) to the position "H" (meaning heavy), the rear extremity of the resilient braking lever will be forced upwardly to increasingly flex the lever to cause its forward extremity to bear against the inner wall of the braking groove 46 to increasingly resist rotation of the spool.

The line is wound upon the spool 23 by means of a line winding pin 55 which is formed on a slide plate 56 and which projects through an opening in the rim of the line winder 32. The slide plate 56 is mounted against the inner face of the winder 32 by means of a retainer rivet 57 which extends through an elongated rivet opening 58 in the slide plate to allow radial movement of the latter. The slide plate 56 is constantly urged radially inward by means of a tension spring 59 so as to tend to withdraw the winding pin 55 below the surface of the rim of the winder 32.

The axial extremity of the slide plate 56 is shaped to form a cam-like point 71 having curved sides, as shown in Fig. 7. When the plate 56 is in its innermost position the rotative path of the cam-like point 71 will bring the latter into contact with the projecting pivot pin 25 of the ratchet lever 24 so that as the point rides over the pin, the slide plate 56 will be urged to its outermost position, with the winding pin 55 projected.

The slide plate 56 is held in its outermost position by the extremity of a double-bowed touch plate spring 60, shown more in detail in Fig. 10. The spring 60 is preformed to provide a transversally extending rocking ridge 61 which is positioned closer to one extremity of the spring than the other. The spring is arcuately and outwardly bowed from the rocking ridge 61, at both sides of the latter, to form a relatively short arcuate portion, as shown at the left in Fig. 10, and a relatively long arcuate portion, as shown at the right in said figure.

When in place in the reel, the rocking ridge 61 of the spring rests in a dent formed in a fulcrum boss 62 on the winder 32. The boss 62 is formed by indenting the rear face of the winder 32. When the touch plate spring 60 is in place in the fulcrum boss 62, its shorter arcuate portion extends radially outward and thence extends rearwardly through a spring passage 63 formed in the winder 32 into frictional contact with the forward face of the slide plate 56. The latter plate is provided with a spring opening or pocket 64 into which the extremity of the shorter arcuate portion of the spring 60 snaps, when the slide plate is moved to its outermost position, to retain the winding pin 55 in the projected position. The longer arcuate portion of the spring 60 extends across the winder axis and resiliently rests against the front face of the winder 32.

A semi-spherical touch plate 65 is concentrically mounted on the front face of the winder 32 by means of a plurality of bent ears 66 which extend rearwardly through arcuate spaced slots in the winder 32 and which are bent inwardly to hook about and engage the back of the winder to maintain the touch plate in place. The touch plate 65 is provided with an indented central portion 67 against which the longer arcuate portion of the touch plate spring 60 bears. The action of the touch plate spring 60 is such that if the touch plate be depressed toward the winder 32, the depressed central portion thereof will depress the longer arcuate portion of the spring 60, causing the spring to act as a lever, with the fulcrum boss 62 as a fulcrum, to pry the shorter portion of the spring forwardly so as to swing the extremity of the latter portion from the spring pocket 64 in the finger slide plate 56 so as to release the latter to the withdrawing action of the tension spring 59. If the touch plate 65 be not depressed, and if the slide plate be forced outwardly by its contact with the pivot pin 25, the extremity of the shorter portion of the spring 60 will act as a click and snap into the receiving pocket 64 to again hold the slide plate in its projected or winding position.

In use, the fishing line is trained from the spool 23 over the rim of the winder 32, over the touch plate 65, through the grommet 21 and thence to the line guides of the fishing rod.

Let us assume that it is desired to make a free running, spinning cast of the bait or lure. The rod is swung forwardly and at the proper point in the cast the touch plate is engaged by any convenient finger, causing the spring 60 to be flexed to release the slide plate 56 and withdraw the winding pin 55 so as to allow the line to freely unwrap from the stationary spool 23 with a circular movement about the rim of the stationary winder. The outflow of line can be controlled by gripping the line against the rod or against the touch plate 65 with one finger. To retrieve the line, the crank 36 is simply rotated forwardly, that is, clockwise in Fig. 4. This acts through the elements 34, 33 and 31 to rotate the winder 32. The initial rotation of the winder 32 will cause the point 71 of the slide plate 56 to contact the pivot pin 25 urge the slide plate and the winding pin 55 radially outward so that the winding pin 55 will engage the line at the point where it passes over the rim of the winder, and as the latter rotates will act to rapidly and accurately wind the line on the stationary spool 23.

The drag on the line while retrieving can be preset by turning the knob 50 to the desired drag indication on the index scale 52. When the load or drag on the incoming line exceeds the preset drag, the spool 23 will rotate with the winder 32 so that no further line will be wrapped upon the spool until the line drag decreases. As the spool rotates under excess drag conditions the ratchet lever 24 clicks over the ratchet teeth 28.

Out flow of the line while "playing" the fish can be controlled by setting the knob 50 at the "lock" position to lock the spool 23 and then resisting rotation of the crank 36 manually. Out flow can also be resisted by setting the knob 50 at the desired resistance and then turning the finger lever 43 to release the ratchet lever 39 so as to prevent reverse rotation of the crank.

Many other adaptations and combination of the many adjustments will become apparent as the fisherman becomes familiar with the improved reel.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A reel for a fishing line comprising: a circular, cup-shaped casing having an open front and a closed rear wall; a cylindrical, stationary, shaft sleeve concentrically mounted on said rear wall and extending forwardly therefrom, a line spool rotatably fitted over said sleeve; means for guiding the fishing line to said spool; means for locking said spool against rotation on said sleeve when desired; a line-winding shaft rotatably and axially mounted in said sleeve and projecting forwardly therefrom; means for rotating said line-winding shaft; a circular cup-shaped line winder mounted on the projecting portion of said line winding shaft and having a rim portion extending rearwardly over and about the circumference of and in overlapping relation with said spool; a slide-plate mounted for radial movement on said line-winder; a line-winding pin extending from said slide-plate and adapted when projected to extend through an opening in said rim to engage the fishing line; spring means urging said slide-plate and said pin radially inward from its projected position; stationary cam means mounted on and extending forwardly from said stationary sleeve into the rotative path of said slideplate and acting to urge the latter radially outward in consequence of rotation of said line winder; and releasable latch means on said line-winder and positioned to engage said slide-plate for holding said pin in the projected position.

2. A reel for a fishing line comprising: a circular, cup-shaped casing having an open front and a closed rear wall; a cylindrical, stationary, shaft sleeve concentrically mounted on said rear wall and extending forwardly therefrom; a line spool rotatably fitted over said sleeve; means for guiding the fishing line to said spool; means for locking said spool against rotation on said sleeve when desired; a line-winding shaft rotatably and axially mounted in said sleeve and projecting forwardly therefrom; means for rotating said line-winding shaft; a circular cup-shaped line winder mounted on the projecting portion of said line-winding shaft and having a rim portion extending rearwardly over and about the circumference of and in overlapping relation with said spool; a slide plate mounted for radial movement on said line winder; a line winding pin carried by said slide plate and adapted to project through an opening in said rim to engage the fishing line; resilient means urging said slide plate radially outward to project said pin; a cam formed on said slide plate; stationary cam engaging means eccentrically projecting from said stationary sleeve into the path of said cam and acting to urge said slide plate radially outward in consequence of the rotation of said line winder; and releasable latch means for holding said pin in the projected position.

3. A reel for a fishing line as described in claim 2 in which the releasable latch means comprises: a circular touch plate; means mounting said touch plate concentrically on said line winder so that said plate may be manually forced rearwardly toward said winder; spring means urging said plate forwardly from said winder; a latch positioned to engage said slide plate when the latter is in the projected position; and means acting to disengage said latch in consequence of the movement of said touch plate toward said winder.

4. A reel for a fishing line as described in claim 3 in which the means for urging the touch plate forwardly and the latch recited in said claim comprise: an arcuately-bowed leaf spring the extremities of which contact said winder and the mid-portion of which contacts said touch plate to urge the latter forwardly from said winder; latch means positioned to engage and hold said slide plate in the projected position; and means operable in consequence of the flexure of said spring for releasing said latch from said slide plate.

5. A reel for a fishing line as described in claim 4 in which the latch means and the latch releasing means comprise: a latch portion formed on said leaf spring and forming a continuation thereof, the extremity of said latch portion extending into engagement with said slide plate and forming a latch for holding said plate in the projected position, so that flexure of said spring will act to move the latch from engagement with said slide plate.

6. A reel for a fishing line as described in claim 5 in which the leaf spring and the latch portion are formed from a single, unitary, double-bowed leaf spring, the joining portion between the bows therein resting against said line winder and forming a fulcrum for tilting the latch portion from engagement with said slide plate.

7. A reel for a fishing line comprising: a circular, cup-shaped casing having an open front and a closed rear wall; a cylindrical, stationary, shaft sleeve concentrically mounted on said rear wall and extending forwardly therefrom; a line spool rotatably fitted over said sleeve; means for guiding the fishing line to said spool; a line-winding shaft rotatably and axially mounted in said sleeve and projecting forwardly therefrom; means for rotating said spool shaft; a circular cup-shaped line winder mounted on the projecting portion of said line-winding shaft and having a rim portion extending over and surrounding said spool; slide-plate slidably mounted for radial movement on the rear face of said line winder; a line-winding pin projecting radially from said slide-plate and adapted when projected to extend through an opening in said rim to engage the fishing line; spring means tensioned between said slide-plate and said line-winder and urging said pin radially inward from its projected position; stationary cam means supported from said sleeve in the path of rotation of said slide-plate and acting to urge said winding pin outwardly in consequence of rotation of said line winder; and releasable latch means mounted on the front face of said line-winder for holding said pin in the projected position.

8. A reel for a fishing line comprising: a housing; a circular, cup shaped, spool-enclosing, casing mounted on the front of said housing; a bearing sleeve concentrically mounted in and extending forwardly from said housing into said casing; a line spool rotatably mounted on said sleeve within said casing; a line-winding shaft extending concentrically through said sleeve and projecting forwardly therefrom; a line winding means mounted on the forwardly projected portion of said line-winding shaft and adapted when said shaft is rotated to wind the line on said spool; and means for selectively resisting rotation of or preventing rotation of said spool comprising: an annular, concentric groove formed in the rear face of said spool; a brake lever pivotally mounted in said housing with its forward extremity in engagement with said groove; and means urging said forward extremity into engagement with one side of said groove to exert a braking action thereon and a locking pocket formed in the other side of said groove into which the forward extremity of said brake lever may be moved to lock said line spool against rotation when desired.

9. A reel for a fishing line as described in claim 8 in which the means for urging the forward extremity of the brake lever comprises a rotatable eccentric cam with the periphery thereof riding against the rear extremity of said lever, said cam having a low point to allow said rear extremity to move to a position which will allow the forward extremity to move into said locking pocket.

References Cited in the file of this patent

UNITED STATES PATENTS

| | | |
|---|---|---|
| 2,615,647 | Palmer | Oct. 28, 1952 |
| 2,630,979 | Uerling | Mar. 10, 1953 |
| 2,644,647 | Denison | July 7, 1953 |
| 2,670,908 | Hill | Mar. 2, 1954 |
| 2,745,607 | Taggart et al. | May 15, 1956 |
| 2,749,058 | Hill | June 5, 1956 |

FOREIGN PATENTS

| | | |
|---|---|---|
| 711,190 | Great Britain | June 23, 1954 |